Figure 1:
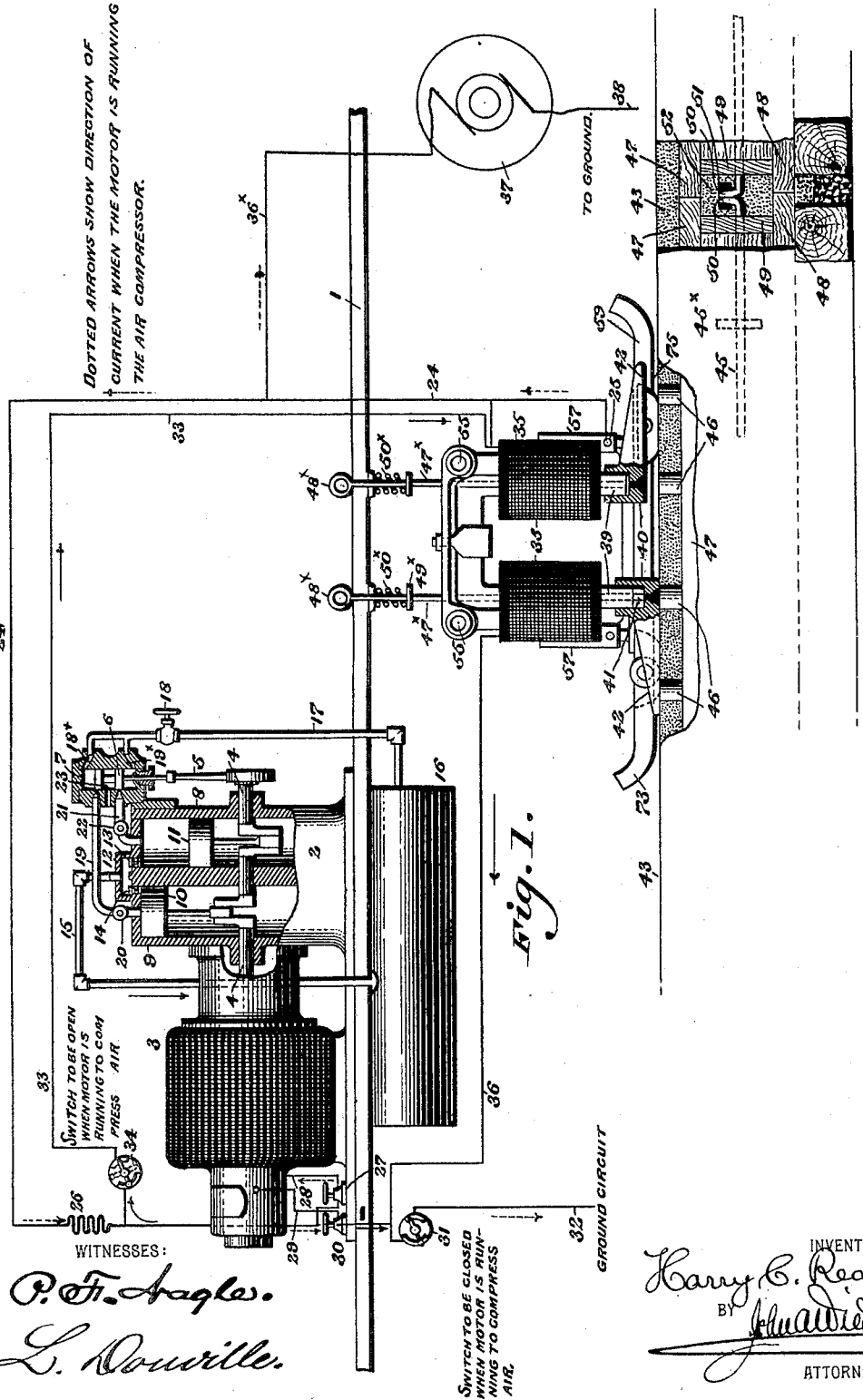

(No Model.) 4 Sheets—Sheet 1.

H. C. REAGAN, Jr.
ELECTRIC RAILWAY.

No. 581,769. Patented May 4, 1897.

(No Model.) 4 Sheets—Sheet 2.
H. C. REAGAN, Jr.
ELECTRIC RAILWAY.
No. 581,769. Patented May 4, 1897.
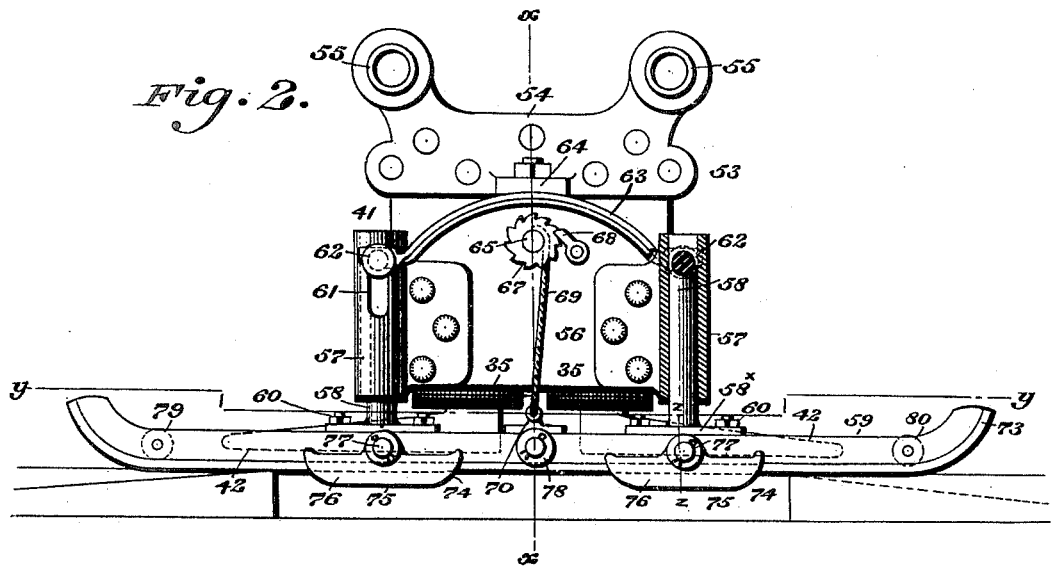
Fig. 2.
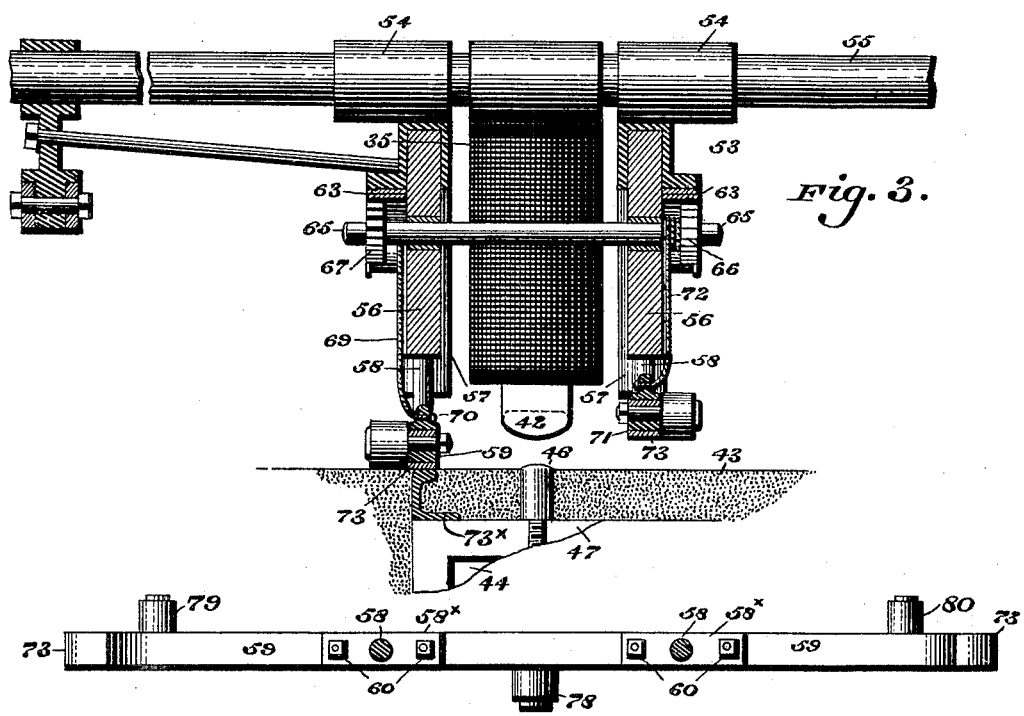
Fig. 3.
Fig. 4.
WITNESSES:
P. H. Eagle.
L. Douville.
INVENTOR
Harry C. Reagan Jr.
BY John Allied Asheim
ATTORNEY.

(No Model.)  H. C. REAGAN, Jr.  4 Sheets—Sheet 3.
ELECTRIC RAILWAY.

No. 581,769.  Patented May 4, 1897.

WITNESSES:
P. F. Aragle.
L. Douville.

INVENTOR
Harry C. Reagan, Jr.
BY John A. Wiedersheim
ATTORNEY.

(No Model.) 4 Sheets—Sheet 4.
H. C. REAGAN, Jr.
ELECTRIC RAILWAY.
No. 581,769. Patented May 4, 1897.
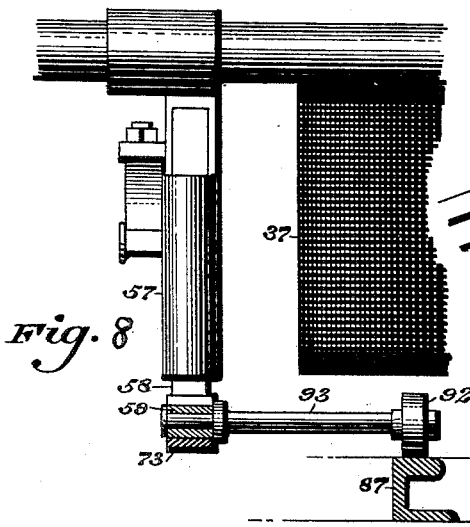
Fig. 8.
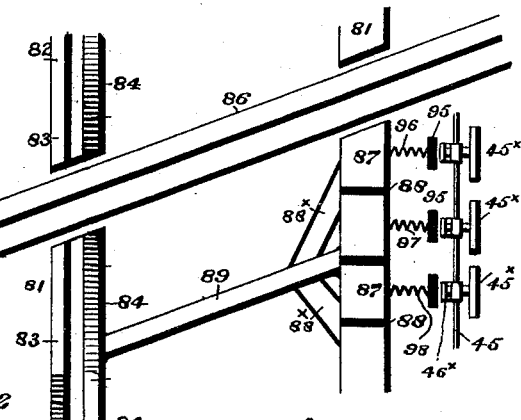
Fig. 9.
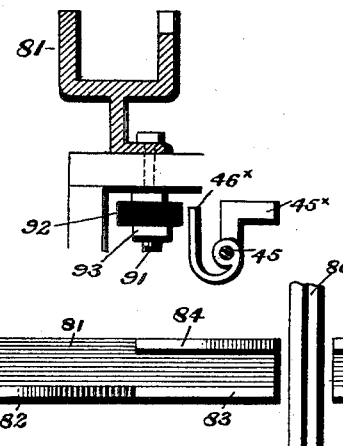
Fig. 10. Fig. 11.
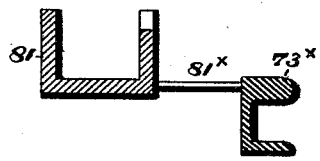
Fig. 12.
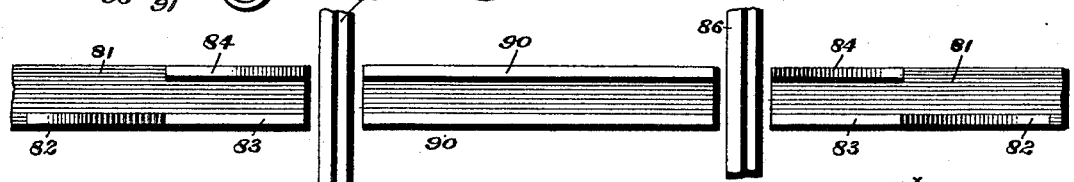
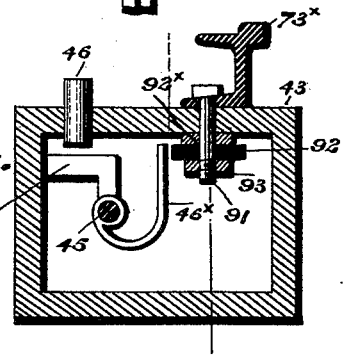
Fig. 14. Fig. 13.
WITNESSES:
P. F. Aagle.
L. Douville.
INVENTOR
Harry C. Reagan, Jr.
BY
John A. Wiedersheim
ATTORNEY.

UNITED STATES PATENT OFFICE.

HARRY C. REAGAN, JR., OF PHILADELPHIA, PENNSYLVANIA.

ELECTRIC RAILWAY.

SPECIFICATION forming part of Letters Patent No. 581,769, dated May 4, 1897.

Application filed December 2, 1896. Serial No. 614,182. (No model.)

*To all whom it may concern:*

Be it known that I, HARRY C. REAGAN, Jr., a citizen of the United States, residing in the city and county of Philadelphia, State of Pennsylvania, have invented a new and useful Improvement in Electric Railways, which improvement is fully set forth in the following specification and accompanying drawings.

My invention relates to improvements in various details of underground electric railways; and it consists of a novel appliance for energizing the magnets carried by the car without unnecessary expenditure of power, the above result being attained by the employment of an electric motor and air-compressor having an air-reservoir, there being suitable intermediate connections between said reservoir and compressor, whereby the motor employed can be run as a generator or as a motor.

It also consists of a novel construction of vertically-adjustable shoes which are adapted to be moved relative to the poles of the car-magnet, so as to be dropped upon the top of an underground conduit and cover one or more magnetic paths for the purpose of attracting the contacts mounted upon the feed-wire contained in said conduit.

It also consists of a novel manner of making the connections between the ends of certain predetermined lengths of said feed-wire.

It also consists of a novel construction of collector device whereby I am enabled in every instance to cross a track running in a different direction without breaking the contact or interrupting the flow of electricity to the car-motor.

It also consists in mounting the collector device as rights and lefts and in providing means for raising either of said devices according to requirements.

It also consists of a novel construction of collector-shoe and its adjuncts.

It further consists of novel details of construction, all as will be hereinafter fully set forth, and specifically pointed out in the claims.

Figure 5:
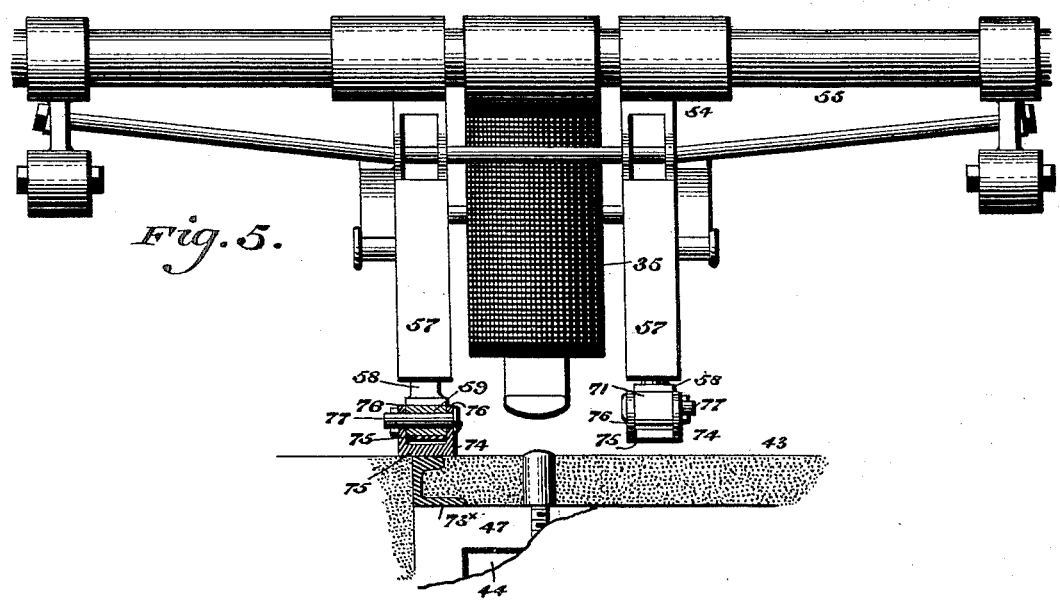
Figure 6:
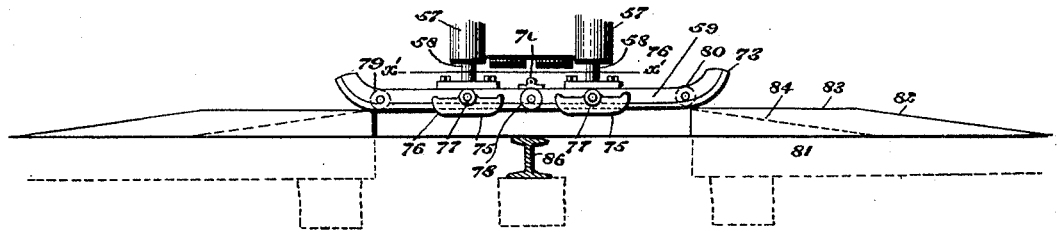
Figure 7:
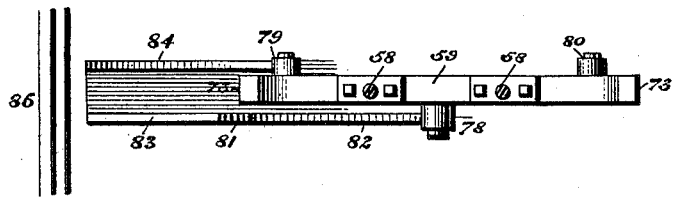

Figure 1 represents a diagrammatic view, partly in side elevation and partly in section, of a portion of an electric railway embodying my invention, showing the means for energizing the magnets, for directing the lines of force through the magnetic paths employed, and for making the connections between the adjacent ends of the feed-wire. Fig. 2 represents a side elevation of one of the collector-bars employed, showing the means for supporting and actuating the same. Fig. 3 represents a side elevation, partly in section, through Fig. 2, the section being taken on line $x$ $x$ and the collector-bars being shown in raised and depressed position, respectively. Fig. 4 represents a sectional view on line $y$ $y$, Fig. 2, certain portions of said figure being omitted for the sake of clearness of illustration. Fig. 5 represents a front elevation of a car-magnet and the shoes supported adjacent thereto, one of said shoes being shown in elevation and the other in section, said section being taken on line $z$ $z$, Fig. 2. Fig. 6 represents, on a reduced scale, a side elevation of a collector device employed and its adjuncts in the act of making a crossing. Fig. 7 represents a section on line $x'$ $x'$, Fig. 6. Fig. 8 represents a front elevation of a portion of a car-magnet and its adjuncts, showing an auxiliary collector device employed. Fig. 9 represents a plan view of a portion of the track or bed at a crossing. Fig. 10 represents a sectional view of a portion of the crossing device. Fig. 11 represents another embodiment of the principle of my invention. Fig. 12 represents a plan view of the crossing device. Figs. 13 and 14 represent longitudinal and transverse sections of a conduit.

Similar numerals of reference indicate corresponding parts in the several figures.

Referring to the drawings, 1 designates the platform of the car, the same having supported thereupon the air-compressor 2 and electric motor 3.

4 designates an extension of the shaft of the motor 3, which latter can also be used as a generator, a suitable portion of said shaft 4 serving as a crank-shaft for the air-compressor.

5 designates an eccentric-rod which is connected to an eccentric-strap mounted on an eccentric carried by said shaft 4 in the usual manner, said rod being connected with a piston or other valve 6, which is located in the valve-chest 7.

8 and 9 designate the cylinders of the air-compressor, which is made duplex in the present instance and provided with the pistons 10 and 11, which are reciprocated by means of the usual connections with the crank-shaft 4.

12 designates a discharge-chamber which has leading thereinto from each cylinder suitable ports which are controlled by the valves 13 14, said valves being normally held seated by reason of the back pressure from the air-reservoir 16, said pressure being conducted to the chamber 12 through the medium of the pipe 15.

17 designates a pipe leading from the air-reservoir 16 and having a valve 18 therein, said pipe terminating in a plurality of branches which communicate with the ports $18^\times$ and $19^\times$ at either end of the valve-chamber.

19 designates a pipe leading from the cylinder 9 to the valve-chest 7, said pipe having a valve 20 therein.

21 designates a pipe leading from the cylinder 8 to a suitable port in the valve-chest 7, said pipe being provided with a valve 22, while the exhaust from said cylinder is allowed to escape through the port 23.

24 designates a conductor leading from the point 25 of the collector device to the resistance-coil 26 and thence to the binding-post 27, from which latter the conductor 28 leads to the motor 3.

29 designates a conductor leading from the opposite brush of said motor to the binding-post 30 and thence to the switch 31, from which latter the conductor 32 leads to the ground-circuit.

33 designates a conductor which leads from the magnet 35 to the switch 34 and thence to the motor-brushes, as will be evident in following out the connections at the left of Fig. 1.

36 designates a conductor leading from the switch 31 to the car-magnet 35, which latter is suitably supported from the car-body.

$36^\times$ designates a conductor leading from the conductor 24 to the car-motor 37, from which latter the conductor 38 leads to the ground.

39 designates poles of the magnets 35, said poles in the present instance projecting downwardly and having mounted thereon the sleeves 40, which are provided with the cavities or recesses 41, in which latter said poles are seated.

42 designates laterally-extending shoes, which latter are attached to said sleeves 40 and are adapted when desired to be lowered so as to rest directly upon the paving material 43, which covers the top of the conduit, in the interior 44 of which is located the feed-wire 45, which is supported intermediate of its ends in any suitable manner, the paving material 43, which covers the top of the conduit, having therein magnetic paths 46, which may extend entirely or partially through the conduits to or toward the interior of the latter, as may be desired.

For the purpose of raising and lowering the shoes 42 according to requirements I attach the upright rods $47^\times$ thereto, the upper ends of said rods passing through the platform 1 and having eyes $48^\times$ thereon, whereby they can be readily manipulated by the motorman or attendant.

$49^\times$ designates a collar attached to said rod $47^\times$, between which and the under portion of the platform or floor 1 is located the spring $50^\times$, the normal tendency of said spring being to hold the shoes 42 in elevated position and away from the magnetic paths 46.

The function of the magnetic paths is to produce a short path for the transmission of the lines of force to the interior of the conduit in order to properly actuate the movable or oscillating contacts $45^\times$, mounted on the feed-wire 45, the precise construction and operation of said contacts and paths having been already described by me in prior patents.

48 designates the bases of adjacent sections of the conduit, the same being suitably supported and having upright end pieces 49, extending therefrom to the tops 47, on which latter said tops are sustained.

The continuous ends 50 of different sections of the feed-wire 45 are, in the preferred embodiment of my invention, deflected at substantially right angles to their longitudinal axes and have the tapered sleeve 51 driven thereupon, whereby a tight contact is secured, the whole being afterward secured permanently by solder or other devices.

The space or chamber 52, in which the deflected ends 50 and the sleeve 51 are located, is then filled with asphaltum, cellulose, or other suitable material.

The operation of the construction seen in Fig. 1 is as follows: The motor 3 is adapted to work either as a motor or as a dynamo, it being understood that the motor is first utilized to operate the air-compressors and thereby fill the reservoir 16 with air, after which by making the proper connections and operating the necessary valves the air is caused to drive the air-compressor which runs the motor, which now becomes a dynamo, thereby energizing the magnets 35, so that there is always a supply of electricity at hand sufficient to energize the magnets 35 to the desired degree for purposes of attracting the contacts mounted on the feed-wire 45.

It is believed to be unnecessary to describe the specific operation of the air-compressors, as the construction and operation of the same is well known in the art, and it will of course be evident that any desired form of compressor may be employed. It will, however, be understood that when the motor is running so as to actuate the air-compressor for the purpose of compressing air, the switch 34 is open, while the switch 31 is closed, it being understood that the dotted arrows show the flow of the current when the motor is running the air-compressor.

Under the conditions last described the valve 18 is closed, and the valves 20 and 22 being closed the reciprocation of the pistons 10 and 11 alternately sucks air into the pipes 19 and 21 through the medium of the port 23, and said air is afterward pumped into the chamber 12 and thence to the pipe 15 of the compressor 16 until a sufficient quantity has accumulated in the latter.

When it is desired to operate the motor as a dynamo, it is only necessary to open the valves 20, 22, and 18, whereupon the valve 6 assumes the function of an admission and exhaust valve to the cylinders 8 and 9, the air-compressor then becoming operative and the exhaust of the dead-air taking place through the exhaust-port 23, the motor then being run at a high rate of speed and the switch 34 being closed and the switch 31 being open the electricity will follow the course indicated over the connections 33 to the magnets 35 and thence through the conductor 36 back to and through the dynamo 3, it being thus seen that I have always at hand a cheap and efficient apparatus for instantly energizing the magnets 35 sufficient to actuate the contacts $45^\times$.

The operation of the shoes 42 (seen in Fig. 1) it is thought will be apparent, the tendency of the spring $50^\times$ being to normally hold said shoes in elevated position, as indicated by the right-hand shoe, while a downward pressure on the eye or handle $48^\times$ will cause said shoes to rest upon or be moved into proximity to the magnetic paths 46, thereby causing the lines of force to pass through the latter and attract the contacts mounted on the feed-wire.

The manner of making the connections between the abutting ends of the feed-wire will, it is thought, be clear from the construction seen in the right-hand portion of Fig. 1, it being of course apparent that the conduit is constructed in sections and that each section is provided with a corresponding length of feed-wire having its ends upturned and connected as described.

The novel construction of collector devices which I preferably employ, and their adjuncts, whereby I am enabled to pass over crossings, &c., will now be described, reference being had first to Figs. 2, 3, and 5.

53 designates a collector device, the same consisting of brackets 54, which are provided with eyes through which pass the rods or tubes 55, by means of which the apparatus is suspended in position from the car-body.

56 designates boards or plates of suitable non-conducting material, which are attached to the branches 54, it being noted that said upright boards or plates 56 are arranged so that one or the other will come over the collector-rail $73^\times$, even if the car is turned around.

57 designates upright sleeves which are secured to the boards 56 on either end thereof and have working therein the upright arms 58, which are attached to the longitudinally-extending strips 59 and 71, which are preferably composed of wood or other suitable material, said arms being secured to said bars 59 or 71 by means of suitable feet $58^\times$, which have fastening devices 60 common thereto and to said strips.

61 designates slots in the upper portion of said sleeves 57, through which the projections or lugs 62 pass, the same being attached to the arms 58.

63 designates a curved or arc-shaped spring or cushioning device which has its ends attached to said lugs 62, while its intermediate or body portion is secured at 64 to any suitable fixed point, it being thus apparent that the arms 58 are capable of an up-and-down movement.

65 designates a shaft rotatably mounted in suitable bearings in the upright plates 56, said shaft having ratchet-wheels 66 and 67 mounted thereupon, said wheels being adapted to be engaged by their adjacent pawls 68.

69 designates a cord or chain or other connection which has one end attached to the shaft 65, adjacent the ratchet-wheel 67, while its other end is attached to substantially the central portion of the bar 59, the strip 71 being similarly supported by means of a connection 72, which is partially wrapped around the shaft 65, it being understood that when one strip 59, which is provided with a metallic shoe 73, is in depressed position and has the shoes 74, hereinafter referred to, in contact with the conductor-rail, as $73^\times$, as indicated at the left of Figs. 3 and 5, the opposite bar 71, carrying its metallic shoe 73, is in raised position, as indicated at the right of said figures.

74 designates auxiliary shoes which are mounted in the present instance substantially under the arms 58, said shoes having the base portion 75 and the upright sides 76, by means of which they are fastened to the bar 59 or 71, it being understood that normally only the portion 75 of said shoes contacts with the collector-rail $73^\times$.

78 designates a roller which is mounted on substantially the central outer portion of the bar 59, while the rollers 79 and 80 are mounted upon the opposite side of said bar and near the ends thereof.

It will thus be seen that through the medium of the spring 63 the shoes 74 will always be kept in contact with the collector-rail or sectional conductor $73^\times$, and by providing the two longitudinally-extending bars, as 59 and 71, and locating the magnets 35 therebetween, in the manner indicated in Figs. 3 and 5, I am enabled to use the collector device as rights and lefts. Thus in going in one direction the bar 59, with its auxiliary shoes, will be used, whereas in traveling in the opposite direction, if the car should be turned around the bar 71 and its shoes could be used, one bar being raised when the other is lowered, and the whole apparatus being rendered effective by a few turns of the shaft 65.

When it is desired to make a crossing and to make provision for the current never to leave the car or to make a short circuit with the rail that is being crossed, the crossing device seen in Figs. 6 to 10, inclusive, is employed, 86 designating a rail to be crossed, the same having located adjacent thereto the elevating or crossing device 81, which is trough-shaped and is provided with the oppositely-located portions 82 and 84, which incline in the same direction, it being evident that the roller 79 will strike the incline 84, and after moving upwardly on the same a short distance the roller 78 will strike the incline 82 at about the same time and will afterward travel over the level portion 83, it being of course seen that the roller 79 has in the meanwhile moved over the section of track 85 and is now in contact with a suitable portion of the conductor on the opposite side, it being of course evident that by the employment of the rollers 79 and 80 and the elevating or trough-shaped section 81 in the manner described there will always be some portion of the collector device to contact with the sectional conductor, and a continuous flow of electricity to the car will be assured under all conditions.

It may be desirable or necessary under some conditions to place the collector bar and shoes at one side of the central line of the car or the third or sectional conductor, in which case I employ the construction seen in Figs. 8 and 9, the necessity for moving the collector-bar being due to the location of the car-magnets 37, which may be carried too low to permit the collector-bars to pass under them. In this case I locate the sleeves 57 and their adjuncts and the strip or bar 59 at the side of the car and attach to said bar the laterally-extending arm 93, which has a shoe or roller 92 mounted thereon and adapted to contact with the sectional conductors 87, the said conductors being separated by the insulation 88 therebetween and having wires 88×, leading to the conductor 89 and thence to the elevating device 81, which is constructed and operates substantially as described with reference to Figs. 6 and 7, the preferred construction employed when the track is to be crossed diagonally being indicated in Figs. 8 and 9, from which it will be apparent that the shoe or collector-roller 92 will have passed over the track 86 and once more made its contact with the sectional conductors 87 while the shoe 73 is moving over said track 86, provision being thus made for insuring a continuous flow of electricity to the car.

In the preferred embodiment of my invention I connect to each of the conductors 87, near the rail to be crossed, one end of a resistance-coil, as 96 97 98, which have their other ends attached to the carbon blocks 95, against which the contact devices strike. These resistances vary, the highest—e. g., 96—having a resistance of fifty ohms and being nearest the rail to be crossed, while the next resistance, as 97, has a resistance of thirty ohms, and the next, 98, has a resistance of ten ohms, whereby the electric stress or power to ground a circuit is reduced.

In Fig. 12 I have shown a complete crossing device for a track, 86 designating the track or pair of rails to be moved, while the elevating device 81, which is located outside of the track, is constructed as shown in Fig. 7, and the portion 90 intermediate the track is trough-shaped and of uniform height, the operation being substantially the same as described in Figs. 6 and 7.

In Figs. 13 and 14 I have shown a modified device for conducting electricity from the feed-wire 45 to the sectional conductor or collector-rail 73×, which is held in position by the bolts 91. 92 designates a bar of carbon, through which said bolts pass, the carbon being held in position by the washer 92×, interposed between it and the top of the conduit and the nuts 93. The operation is apparent, the car-magnet 35 exerting its influence through the magnetic paths 46 and attracting the contacts 45×, so that the resilient arm 46× will be brought against the bar 92, the electricity being conducted thence to the sectional conductor 73× and thence by the collector devices to the car-motor by the proper connections.

It will of course be understood that various changes may be made by those skilled in the art which will come within the scope of my invention, and I do not, therefore, desire to be restricted in every instance to the exact constructions I have shown and described.

Having thus described my invention, what I claim as new, and desire to secure by Letters Patent, is—

1. The combination of an electric motor, an air-compressor and an air-storage reservoir, pipes leading to and from said reservoir, and having connection with a discharge-chamber of the compressor and with the valve-chest of the latter respectively, an electromagnet suitably supported, and connections common to said motor and magnet.

2. In an electric railroad, an air-compressor, an electric motor having its shaft adapted to serve as the crank-shaft of said air-compressor, a valve-chest for the latter, a valve therein having suitable connections intermediate it and said shaft, a discharge-chamber for said compressor, having a check-valve located therein, a pipe leading from said discharge-chamber to an air-storage reservoir, a pipe leading from the latter and communicating with ports at each end of the valve-chest, valved pipes communicating with the latter and with each cylinder of the air-compressor, an electromagnet and conductors common thereto and to said motor.

3. In an electric railroad, an electric motor, an air-compressor, an electromagnet supported upon the car, connections common to said magnet and motor, a suitable valve and valve-operating mechanism for said compressor, pipes or ports leading to said compressor, stop-valves in said pipes, a storage-reservoir, a pipe leading therefrom to the operating-valve of the compressor, the cylinders thereof being adapted to serve as engines and thus cause said motor-armature to generate a current.

4. The combination of an electric motor, an air-compressor, a suitable valve and valve-operating mechanism, with an electromagnet, a circuit from the brushes of the motor to said magnet, and suitable switches placed in said circuit, whereby the latter is completed from said motor-brushes to said magnet when the motor is operated as a generator, and open when it is operated as a motor to compress air.

5. In an electric railroad, an electromagnet suitably supported, said magnet having adjustable shoes mounted on the poles thereof, and means for actuating said shoes.

6. In an electric railroad, a conduit, a casing therefor, a series of independent magnetic paths located above said conduit, in combination with an electromagnet having shoes mounted on the poles thereof, said shoes being adjustable relative to said magnet-poles, and means for actuating said shoes.

7. In an electric railroad, a car, an electromagnet supported thereupon, and having poles projecting therefrom, a shoe located on one of said poles, and capable of up-and-down movement, a rod attached to said shoe and terminating in proximity to the attendant, means for holding said shoe normally above the track, and means for depressing said shoe when desired.

8. In an electric railroad, a feed-wire constructed in sections, the adjacent sections of said feed-wire having their ends deflected at substantially a right angle to the wire, a tapered sleeve adapted to receive said ends, and means for holding said sleeve and ends in juxtaposition.

9. An electric railroad having a sectional conduit, means for closing the ends of said sections, top and bottom closures for the latter, having their ends extending beyond the ends of said sections and abutting against each other, thereby forming a chamber between said sections, feed-wires for the latter passing through the ends of said sections into said chamber the ends of said wires being bent at an angle and suitably joined, and suitable insulating material located in said chamber between said sections, whereby leakage of electricity is prevented.

10. In an electric railroad, a sectional conduit, suitable paving material therefor, magnetic paths located in said paving material, means for closing the ends of each section, the top and bottom closures extending beyond said ends, thereby forming a chamber, a sectional feed-wire having its extremities terminating in said chamber, said ends being bent at an angle to the longitudinal axis of said feed-wire, and having a sleeve engaging therewith, means for holding said sleeve in position, and means for preventing leakage of electricity from said conduit.

11. In an electric railroad, a bar having a metallic strip attached thereto, auxiliary shoes supported on said bar, means for raising and lowering and for cushioning the movement of the latter.

12. In an electric railroad, a car a collector device mounted thereon, a bracket suitably supported, a non-conducting plate secured to said bracket, sleeves attached to said plate, arms movable in said sleeves, a collector-bar secured to said arms having a shoe or wheel attached thereto, and means for imparting an up-and-down movement to said bar.

13. In an electric railroad, a plurality of collector devices supported from a car, means for raising and lowering said devices according to requirements, and means for enabling said devices to be used as rights and lefts, only one of said devices being normally operative.

14. In an electric railroad, a bar having a metallic shoe or strip attached thereto, rollers located on a side of said bar near the ends thereof, a roller located on the opposite side of said bar, and means for raising and lowering said bar.

15. In an electric railroad, a bar, a metallic strip attached thereto, auxiliary shoes supported on said bar, arms projecting upwardly from the latter, sleeves in which said arms are located, slots in said sleeves, lugs attached to said arms and projecting from said slots, a spring attached to said lugs, a support for said spring, and means for raising and lowering said bar.

16. In an electric railroad, a pair of bars suitably supported, metal strips and shoes attached thereto, a magnet located between said bars, and means for raising and lowering the latter.

17. In an electric railroad, a plurality of upright plates suitably supported, a magnet located between said plates, a collector-bar supported from said plates on either side of said magnet, the latter being provided with projecting shoes, and means for raising and lowering said bars.

18. In an electric railroad, a shaft, plates in which said shaft is rotatably mounted, a collector-bar suitably guided, connections from said bar to said shaft, pawl-and-ratchet mechanism for the latter, a magnet located between said plates, and provided with laterally-extending shoes, and means for cushioning the movement of said bar.

19. An electric railroad, a collector device, the same consisting of a bar suitably guided and supported, means for raising and lowering said bar, and cushioning devices for the latter, in combination with means located at a crossing, whereby said collector device is enabled to cross a track without causing any break in the supply of electricity to the car, or making a short circuit with the rail that is being crossed.

20. In an electric railroad, a trough-shaped frame provided with inclines on its sides, in combination with a collector-bar having rollers mounted on opposite sides thereof, means for cushioning the movement of said bar, and means for conducting electricity therefrom to the car-motor.

21. In an electric railroad, the combination of a trough-shaped frame whose walls are provided with inclines, means for conveying electricity from an underground conduit to said frame, a collector-bar suitably guided and supported, and having devices thereon whereby the supply of electricity thereto, while making a crossing, is uninterrupted, and means for conducting electricity from said bar to the car-motor.

22. In an electric railroad, the combination of a collector-bar, means for supporting and guiding the same, and a laterally-extending arm attached to said bar, a collector wheel or shoe mounted on said arm and adapted to travel on sectional conductors, in combination with a crossing device adapted to contact with said bar, certain portions of said device having inclined faces.

23. In an electric railroad, a conduit, magnetic paths for conveying the lines of force to the interior thereof, sectional conductors located adjacent said conduit, fastening devices passing through said conductor and leading to the interior of said conduit, carbon plates supported on said fastening devices, a feed-wire, and oscillatory contacts mounted thereon and having a portion adapted to contact with said carbon plates.

24. In an electric railroad, a sectional conductor, means for holding the same in position, a closed conduit, and carbon plates sustained by said means within said conduit, in combination with devices for conducting electricity to said carbon plates from an electrical supply, and from said sectional conductor to the car-motor.

25. In an electric railroad, a collector-bar having rollers arranged in staggered order on each side thereof, and means for raising and lowering said bar.

26. In an electric railroad, an elevating device, connections therefrom to a series of sectional conductors, a series of carbon or other conductive plates, resistance-coils common to said conductors and plates said coils increasing in resistance as they approach the rail to be crossed, and means for conducting electricity to said conductors.

27. The herein-described crossing device, consisting of the trough-shaped member 91, having the inclined wall 84 on one side and the inclined wall 82, and the laterally-extending wall 83 on the opposite side, the above devices being placed outside the track to be crossed, in combination with the trough-shaped section 90 intermediate said tracks, the walls thereof being of substantially uniform height.

28. In an electric railroad, a collector-bar having a strip on the bottom thereof, rollers arranged in staggered order on the side thereof, and means for raising and lowering said bar.

29. In an electric railroad, a bar having a strip on the lower portion thereof, shoes also mounted thereon, and rollers arranged in staggered order on either side of said bar, in combination with means for raising and lowering and cushioning the movement of the latter.

30. In an electric railroad, a plurality of collector-bars, each having a strip on the under side thereof, and rollers arranged in staggered order on either side of each of said bars, in combination with means for raising and lowering said bars, the latter being arranged as rights and lefts.

31. In an electric railroad, a magnet suitably supported, a collector-bar arranged on either side thereof, rollers attached to said bar on each side in staggered order, and means for raising and lowering said bar.

32. In an electric railroad, a sectional conductor, means for holding the same in position, a closed conduit, and carbon or other conductive plates supported by said means in said conduit, in combination with a feed-wire having oscillatory contacts mounted thereon, said contacts being adapted to complete the circuit to said plates when actuated by a car-magnet.

33. In an electric railroad, a sectional conductor, means for holding the same in position, a closed conduit, and carbon or other conductive plates secured to said means within said conduit, in combination with a feed-wire having oscillatory contacts mounted thereon, and adapted to contact with said plates means for conducting electricity from the latter to the car-motor, and means for operating said contacts.

34. In an electric railroad, a crossing device, connections therefrom to a series of sectional conductors, a series of carbon or other conductive plates suitably supported, resistance-coils common to said conductors and plates, said coils increasing in resistance as they approach the rail to be crossed, a feed-wire located adjacent said plates, and oscillatory contacts mounted on said feed-wire and adapted to contact with said plates.

35. The combination of an electric motor, an air-compressor, an air-storage reservoir, and valved connections intermediate said reservoir and compressor, in combination with means for using said motor as a generator or as a motor according to requirements, the crank-shaft of said compressor serving as a main shaft of said motor.

HARRY C. REAGAN, Jr.

Witnesses:
JOHN A. WIEDERSHEIM,
E. HAYWARD FAIRBANKS.